(12) United States Patent
Kimura et al.

(10) Patent No.: US 12,359,768 B2
(45) Date of Patent: Jul. 15, 2025

(54) BRACKET AND ELECTRONIC APPARATUS

(71) Applicant: LENOVO (SINGAPORE) PTE. LTD., Singapore (SG)

(72) Inventors: Kosei Kimura, Yokohama (JP); Takumi Imai, Yokohama (JP); Yoshiyuki Shibayama, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 126 days.

(21) Appl. No.: 18/066,952

(22) Filed: Dec. 15, 2022

(65) Prior Publication Data
US 2023/0250919 A1 Aug. 10, 2023

(30) Foreign Application Priority Data
Feb. 4, 2022 (JP) .................. 2022-016710

(51) Int. Cl.
*F16M 11/20* (2006.01)
*F16M 13/02* (2006.01)
*H04N 7/14* (2006.01)

(52) U.S. Cl.
CPC ..... *F16M 11/2021* (2013.01); *F16M 11/2092* (2013.01); *F16M 13/02* (2013.01); *H04N 7/142* (2013.01)

(58) Field of Classification Search
CPC ........... F16M 11/2021; F16M 11/2092; F16M 13/02; H04N 7/142
See application file for complete search history.

(56) References Cited

U.S. PATENT DOCUMENTS

| | | | |
|---|---|---|---|
| 10,281,080 B1 | 5/2019 | Massey | |
| 2006/0221261 A1 | 10/2006 | Funai | |
| 2017/0059087 A1* | 3/2017 | Lam | F16M 11/2092 |
| 2021/0254780 A1* | 8/2021 | Massey | F16M 11/04 |
| 2022/0378226 A1* | 12/2022 | Yoon | F16M 11/045 |

FOREIGN PATENT DOCUMENTS

| | | |
|---|---|---|
| JP | 2005165351 A | 6/2005 |
| JP | 2007065510 A | 3/2007 |
| JP | 2008281602 A | 11/2008 |
| JP | 2020178244 A | 10/2020 |

* cited by examiner

*Primary Examiner* — Allen L Parker
*Assistant Examiner* — Peter Krim
(74) *Attorney, Agent, or Firm* — SHIMOKAJI IP

(57) ABSTRACT

A bracket includes: a first hinge shaft; a second hinge shaft; a base plate including a first arm supported by the first hinge shaft and a second arm supported by the second hinge shaft; a fixing plate rotatable relative to the first arm around an axis of the first hinge shaft, and configured to fix the bracket to a mounting object; an attachment plate rotatable relative to the second arm around an axis of the second hinge shaft, and configured to have a chassis of the electronic apparatus attached thereto; and a stopper mechanism configured to selectively restrict relative rotation of the first arm and the fixing plate around the axis of the first hinge shaft and relative rotation of the second arm and the attachment plate around the axis of the second hinge shaft.

6 Claims, 14 Drawing Sheets

BRACKET AND ELECTRONIC APPARATUS

BACKGROUND OF THE INVENTION

Field of the Invention

The present invention relates to a bracket for an electronic apparatus, and an electronic apparatus including the bracket.

Description of the Related Art

Electronic apparatuses that enable conferencing and communication between remote locations through audio and video using the Internet, telephone lines, etc. are currently used. This type of electronic apparatus includes a speaker device for outputting audio, etc. generated from the other party (for example, see Japanese Unexamined Patent Application Publication No. 2020-178244).

SUMMARY OF THE INVENTION

The demand for online conferencing using displays has increased in recent years. There has thus been a demand to use the foregoing electronic apparatus in a wall-mounted state, for example, above or below a wall-mounted large display. In this case, it is necessary to minimize the depth dimension of the chassis of the electronic apparatus to reduce the length of protrusion from the wall.

The foregoing electronic apparatus may have a camera and/or a display unit on the front of the chassis. It is desirable that the camera, etc. can capture the conference participant from the front as much as possible. The electronic apparatus may accordingly include a motor mechanism for changing the angle of the camera. This, however, causes an increase in mechanism size and an increase in protrusion amount. Alternatively, a bracket for wall mounting may include a tilt structure. In this case, it is necessary to enable tilt operation over a sufficient angle range while minimizing the protrusion amount of the bracket from the wall.

In view of the above-described problems with the conventional techniques, the present invention has an object of providing a bracket that can, among other things, reduce the depth dimension of an electronic apparatus while enabling its tilt operation, and an electronic apparatus including the bracket.

A bracket according to a first aspect of the present invention is a bracket for an electronic apparatus, comprising: a first hinge shaft; a second hinge shaft; a base plate including a first arm supported by the first hinge shaft and a second arm supported by the second hinge shaft; a fixing plate supported by the first hinge shaft and rotatable relative to the first arm around an axis of the first hinge shaft, and configured to fix the bracket to a mounting object; an attachment plate supported by the second hinge shaft and rotatable relative to the second arm around an axis of the second hinge shaft, and configured to have a chassis of the electronic apparatus attached thereto; and a stopper mechanism configured to selectively restrict relative rotation of the first arm and the fixing plate around the axis of the first hinge shaft and relative rotation of the second arm and the attachment plate around the axis of the second hinge shaft.

An electronic apparatus according to a second aspect of the present invention is an electronic apparatus comprising: a chassis containing an electronic component and having a camera or a display unit on a first surface thereof; and a bracket attached to a second surface of the chassis and configured to wall-mount and fix the chassis, wherein the bracket includes: a first hinge shaft; a second hinge shaft; a base plate including a first arm supported by the first hinge shaft and a second arm supported by the second hinge shaft; a fixing plate supported by the first hinge shaft and rotatable relative to the first arm around an axis of the first hinge shaft, and configured to fix the bracket to a wall; an attachment plate supported by the second hinge shaft and rotatable relative to the second arm around an axis of the second hinge shaft, and having the chassis attached thereto; and a stopper mechanism configured to selectively restrict relative rotation of the first arm and the fixing plate around the axis of the first hinge shaft and relative rotation of the second arm and the attachment plate around the axis of the second hinge shaft.

The above-described aspects of the present invention can, among other things, reduce the depth dimension of an electronic apparatus while enabling its tilt operation.

DETAILED DESCRIPTION OF THE INVENTION

Preferred embodiments of an electronic apparatus and a bracket according to the present invention will be described in detail below, with reference to the accompanying drawings.

Figure 1:
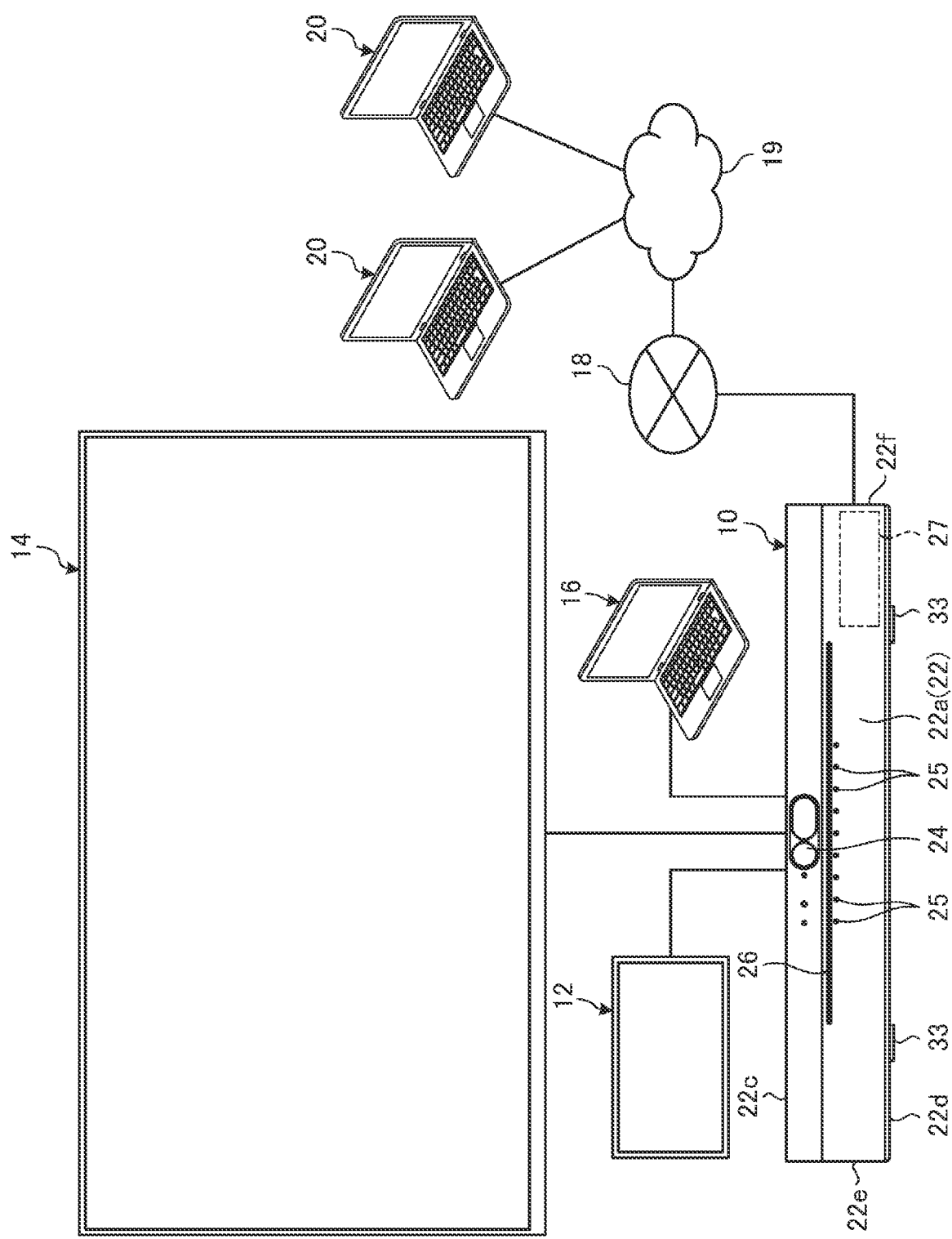
FIG. 1 is a system diagram illustrating one use mode of an electronic apparatus according to an embodiment.

FIG. 1 is a system diagram illustrating one use mode of an electronic apparatus 10 according to an embodiment. The electronic apparatus 10 according to this embodiment is a terminal apparatus that can be used in an online conferencing system which performs conferencing and communication using audio and video with remote locations connected via the Internet, for example.

The online conferencing system illustrated in FIG. 1 includes the electronic apparatus 10 according to this embodiment, a touch panel operation unit 12, an external display 14, and a personal computer 16. As illustrated in FIG. 1, the electronic apparatus 10 is wall-mounted and fixed above or below the external display 14 wall-mounted and fixed to the wall of a conference room, for example. The electronic apparatus 10 may also be used in a state of being placed on a table or the like.

The touch panel operation unit 12 is a touch panel type terminal for input operation to the electronic apparatus 10. The external display 14 is capable of displaying, for example, information from a personal computer 20 of each other conference participant connected to the electronic apparatus 10 via an Internet 18 and a cloud server 19. Specifically, the external display 14 displays face images, materials, etc. of the other conference participants under control of the electronic apparatus 10. The personal computer 16 is capable of transmitting, for example, materials from the user of the electronic apparatus 10 to the external display 14 and the personal computers 20 of the other participants. The personal computer 16 may be used for input operation to the electronic apparatus 10, instead of the touch panel operation unit 12.

The electronic apparatus 10, the touch panel operation unit 12, the external display 14, and the personal computer 16 are connected using connectors and cables conforming to a predetermined connection standard such as the USB standard or the HDMI® standard.

First, an overview of the electronic apparatus 10 will be given below.

Figure 2A:
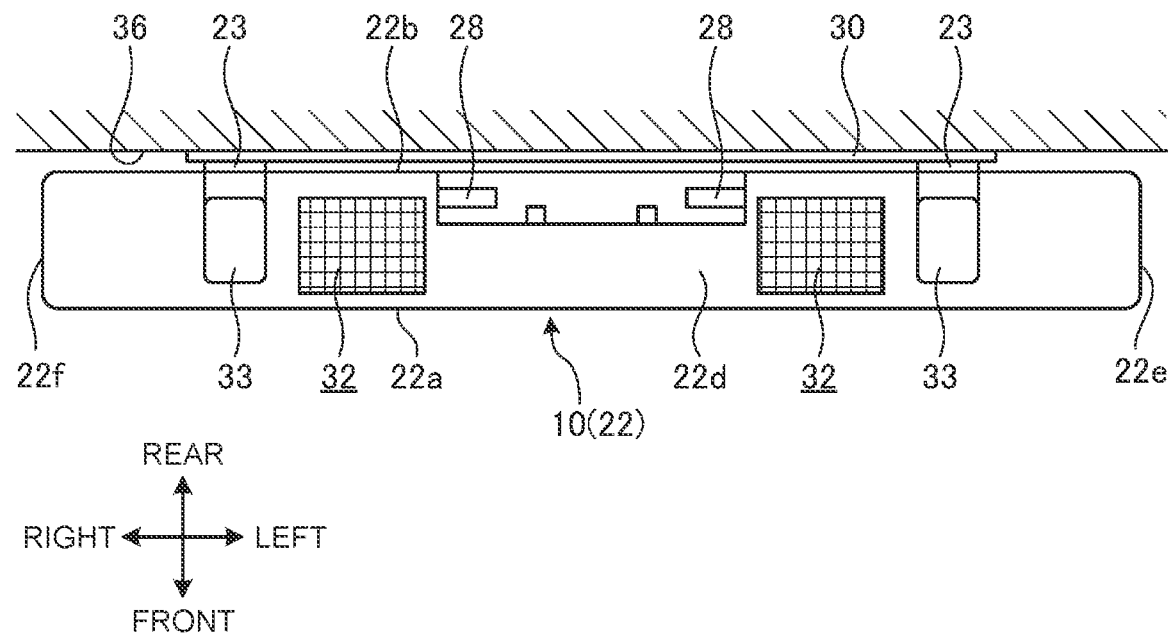
FIG. 2A is a bottom view of the electronic apparatus.
Figure 2B:
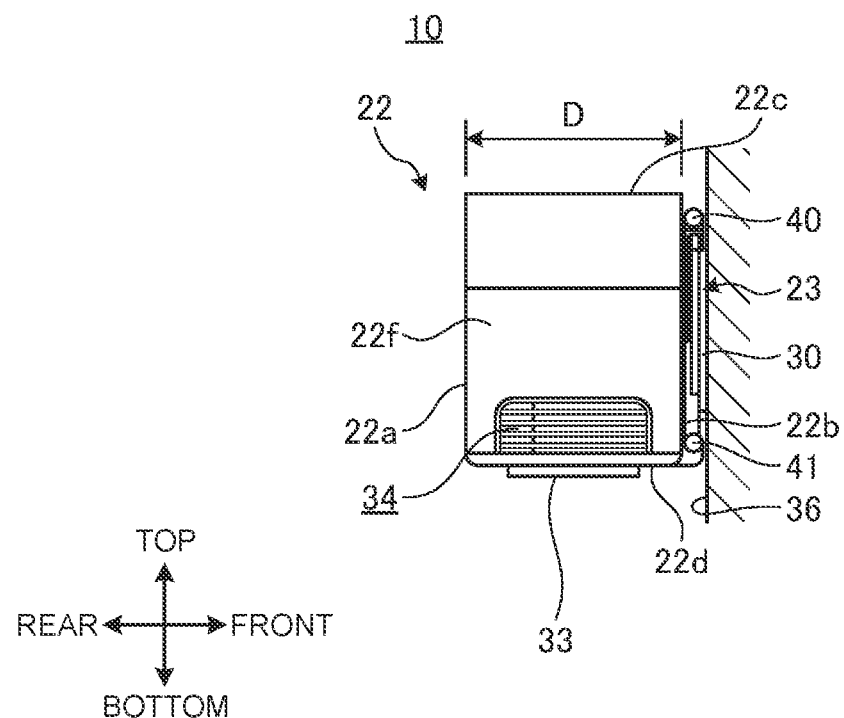
FIG. 2B is a side view of the electronic apparatus.

FIGS. 2A and 2B are a bottom view and a side view of the electronic apparatus 10, respectively. FIG. 2B is a right side view of the electronic apparatus 10, which is bilaterally symmetrical with a left side view of the electronic apparatus 10.

As illustrated in FIGS. 2A and 2B, the electronic apparatus 10 includes a chassis 22 and a bracket 23. In the following description, regarding the electronic apparatus 10 and the bracket 23 as seen from the front as illustrated in FIG. 1, the height direction of the chassis 22 is referred to as "top-bottom", the width direction of the chassis 22 is referred to as "left-right", and the depth direction of the chassis 22 is referred to as "front-rear".

The chassis 22 is a substantially rectangular parallelepiped box having a laterally long bar shape. Thus, the front surface 22a and the rear surface 22b of the chassis 22 each have a long width dimension in the left-right direction and a height dimension smaller than the width dimension. The top surface 22c and the bottom surface 22d of the chassis 22 each have a long width dimension in the left-right direction and a depth dimension D smaller than the width dimension. The left surface 22e and the right surface 22f of the chassis 22 each have the narrow depth dimension D in the front-rear direction and a height dimension in the top-bottom direction slightly larger than the depth dimension D.

As illustrated in FIG. 1, a camera 24, a microphone 25, and a light 26 are provided at the front surface 22a.

The camera 24 is a camera device that captures an image of the user in front of the electronic apparatus 10. The camera 24 is located in an upper part at substantially the center of the front surface 22a in the left-right direction. The microphone 25 is a microphone device that collects, for example, the voice of the user of the electronic apparatus 10. The microphone 25 faces the front surface 22a through a plurality of microphone holes arranged in the left-right direction below the camera 24. The light 26 is a light notification unit that notifies the user of the operation state of the electronic apparatus 10, the sound collection state of the microphone 25, and the like, and is a display unit called a smart light. The light 26 faces the front surface 22a through a laterally long, narrow light transmission window provided between the camera 24 and the microphone 25. A power lamp, etc. of the electronic apparatus 10 are also provided at the front surface 22a. A display unit 27 such as a liquid crystal display for displaying a clock and an operation state may be provided at the front surface 22a.

As illustrated in FIG. 2A, a connection terminal unit 28, a pair of left and right brackets 23, and a bracket plate 30 are provided at the rear surface 22b. Examples of electronic components installed in the chassis 22 include a motherboard on which a CPU is mounted, a speaker device, and a cooling device. An air inlet for such a cooling device is provided at the rear surface 22b. The connection terminal unit 28 is a group of external terminals to which connectors for connecting the electronic apparatus 10 to the touch panel operation unit 12, the external display 14, the personal computer 16, the Internet 18, and the like are connected. A power cable for connecting the electronic apparatus 10 to an external power source is also connected to the connection terminal unit 28. The brackets 23 and the bracket plate 30 will be described later.

As illustrated in FIG. 2A, a pair of left and right bottom air inlets 32 and a pair of left and right rubber legs 33 are provided at the bottom surface 22d. The top surface 22c has substantially the same outer shape as the bottom surface 22d, but is formed of a flat plate. The rubber legs 33 are used when the electronic apparatus 10 is placed on a table or the like. As illustrated in FIG. 2B, a side air outlet 34 is provided at the right surface 22f. The side air outlet 34 is also provided at the left surface 22e.

Next, the brackets 23 will be described below.

The electronic apparatus 10 can be wall-mounted and fixed to the wall 36 of a conference room or the like, as mentioned above. In the case of using the electronic apparatus 10 in a wall-mounted state, the electronic apparatus 10 is used with the brackets 23 and the bracket plate 30 being attached to the rear surface 22b as illustrated in FIGS. 2A and 2B. The electronic apparatus 10 may be mounted on, for example, a rack or the like for installing the external display 14, instead of the wall 36.

The bracket plate 30 is a metal plate that is long in the left-right direction. The left and right brackets 23 are screw-fixed to the left and right sides of the front surface of the bracket plate 30, and the rear surface of the bracket plate 30 is screw-fixed to the wall 36. Thus, the bracket plate 30 supports the brackets 23 and the chassis 22 attached to the brackets 23, on the wall 36. The bracket plate 30 may be omitted. In this case, the left and right brackets 23 are directly fixed to the wall 36.

Figure 3:
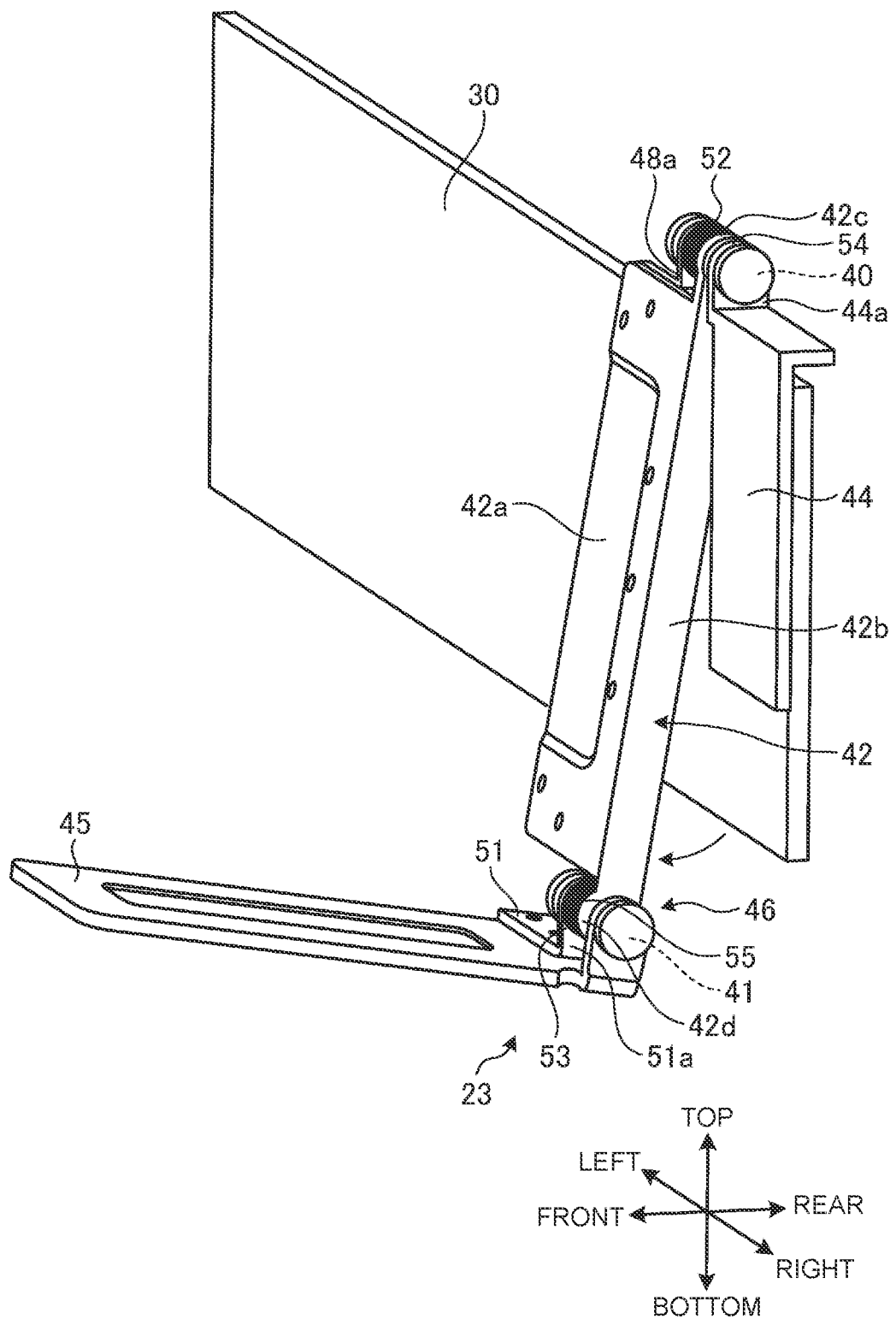
FIG. 3 is a perspective view of a bracket tilted up, as seen from the front.
Figure 4:
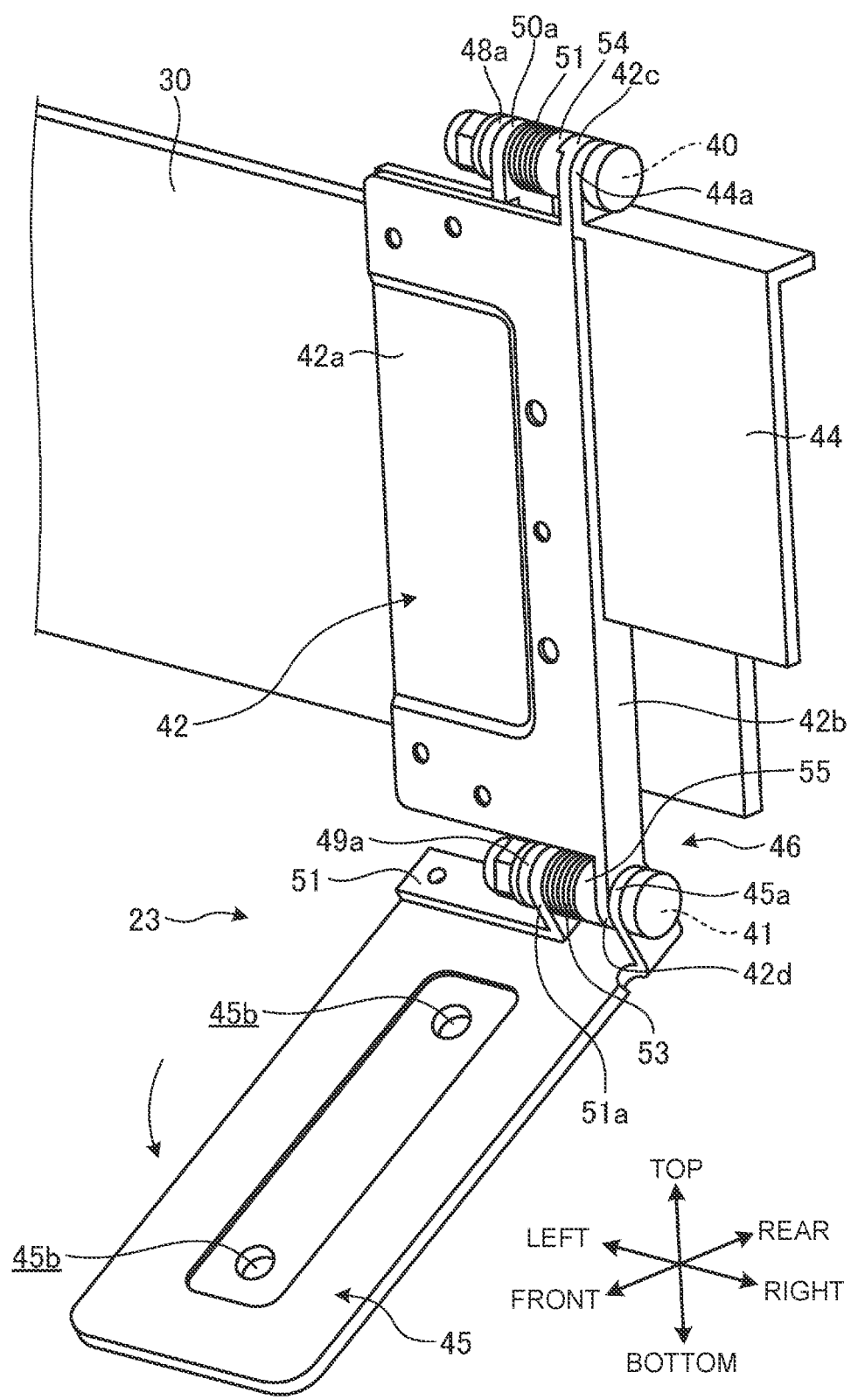
FIG. 4 is a perspective view of the bracket tilted down, as seen from the front.
Figure 5:
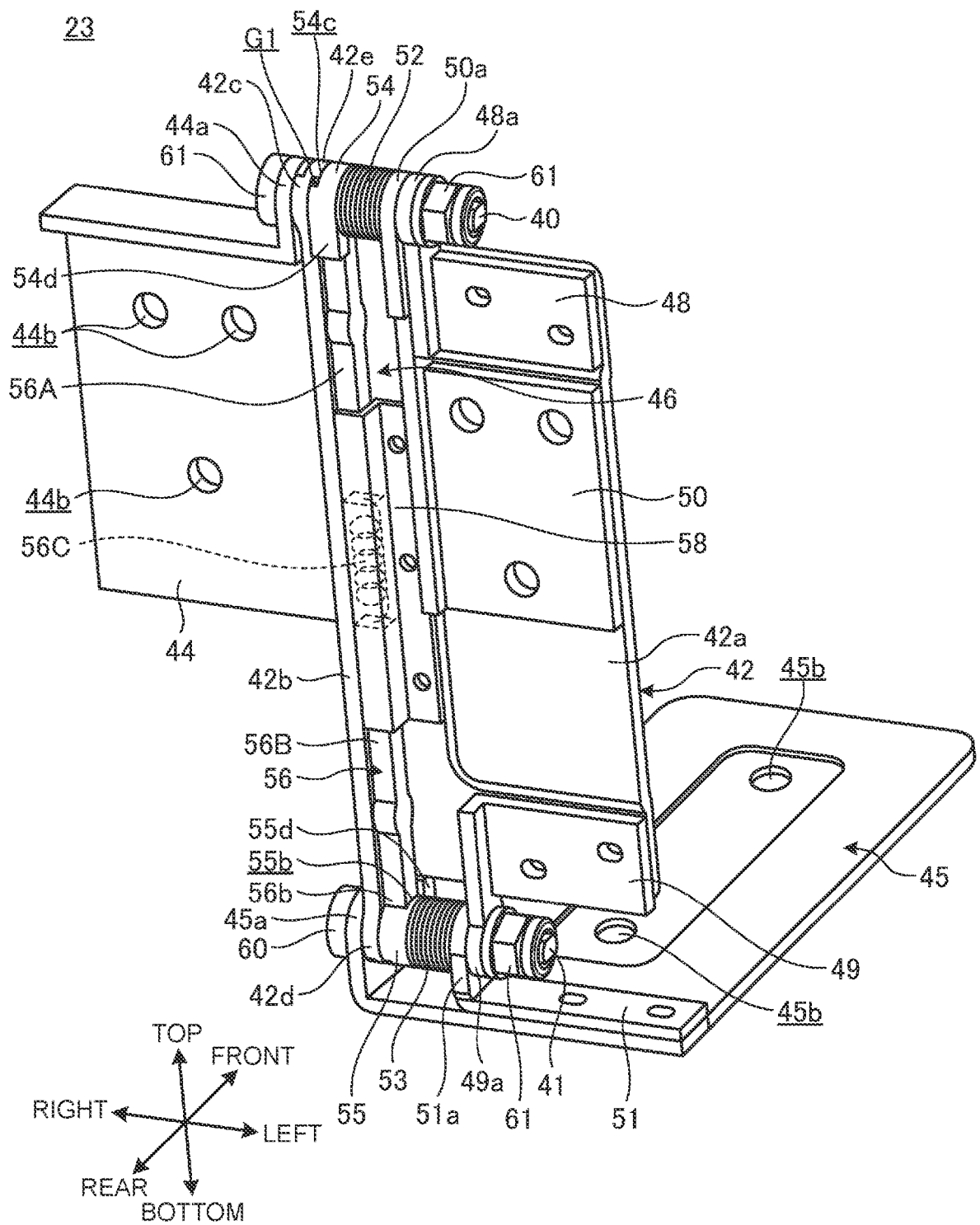
FIG. 5 is a perspective view of the bracket in its initial position, as seen from the rear.

FIG. 3 is a perspective view of the bracket 23 tilted up, as seen from the front. FIG. 4 is a perspective view of the bracket 23 tilted down, as seen from the front. FIG. 5 is a perspective view of the bracket 23 in its initial position, as seen from the rear. Although the bracket plate 30 is schematically illustrated as one flat plate without unevenness in FIGS. 3 and 4, the actual bracket plate 30 has screw holes and bends for securing strength in various parts. FIGS. 3 to 5 illustrate only one of the left and right brackets 23. The other bracket 23 may have the same structure as or a structure bilaterally symmetrical with the bracket 23 illustrated in the drawings.

Figure 8A:
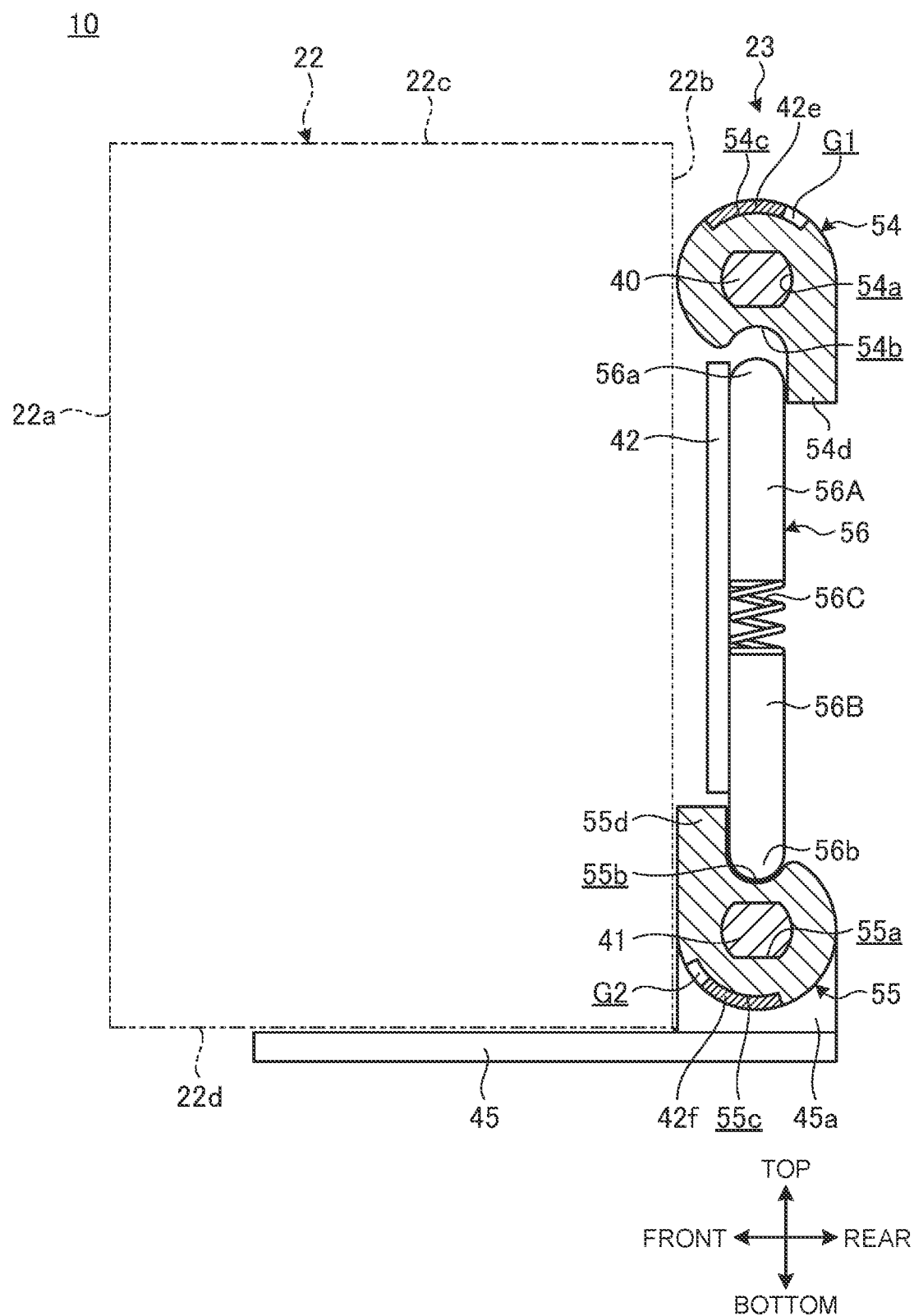
FIG. 8A is a schematic side sectional view of the bracket in the initial position.
Figure 8B:
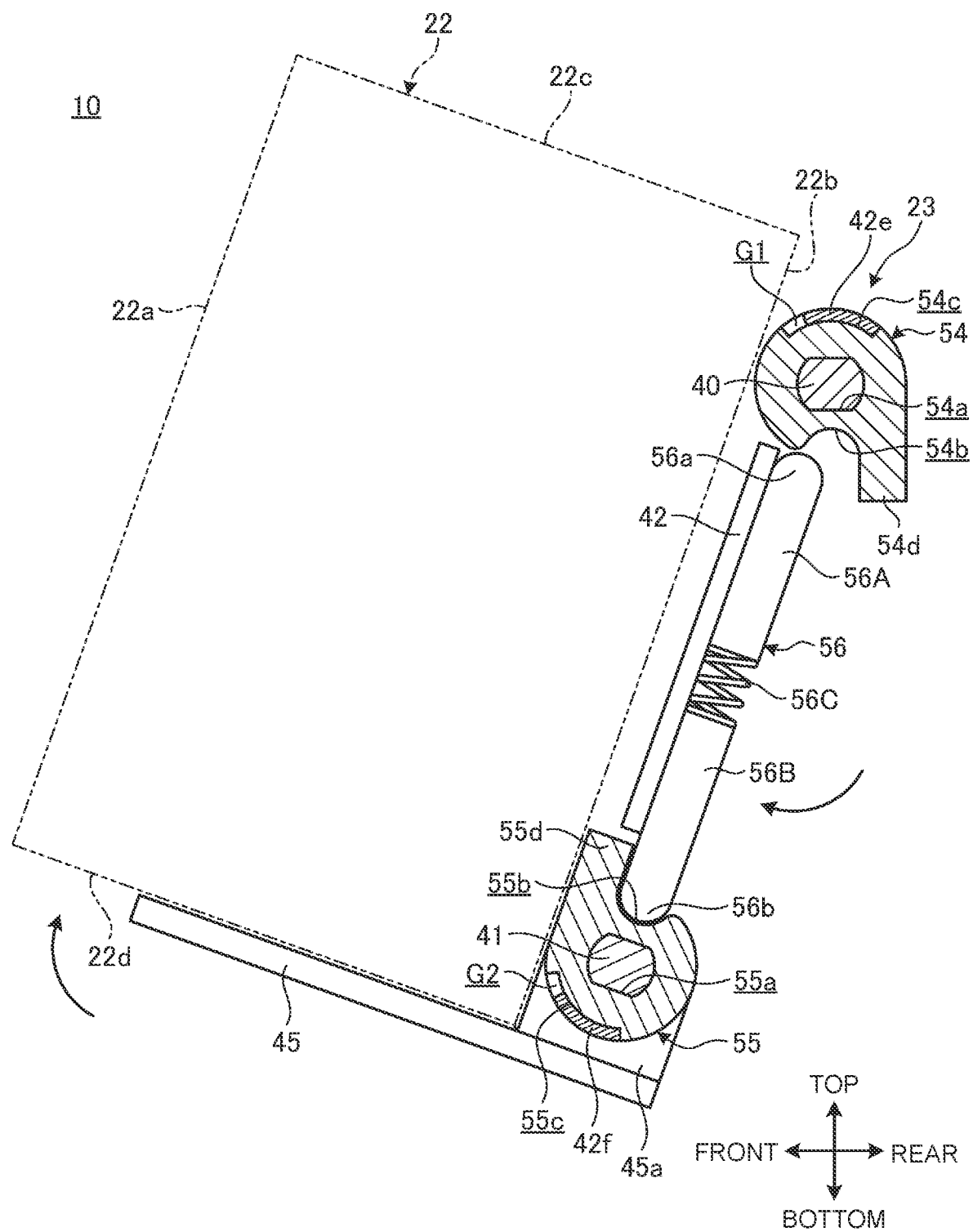
FIG. 8B is a side sectional view illustrating a state in which the bracket illustrated in FIG. 8A is tilted up.
Figure 8C:
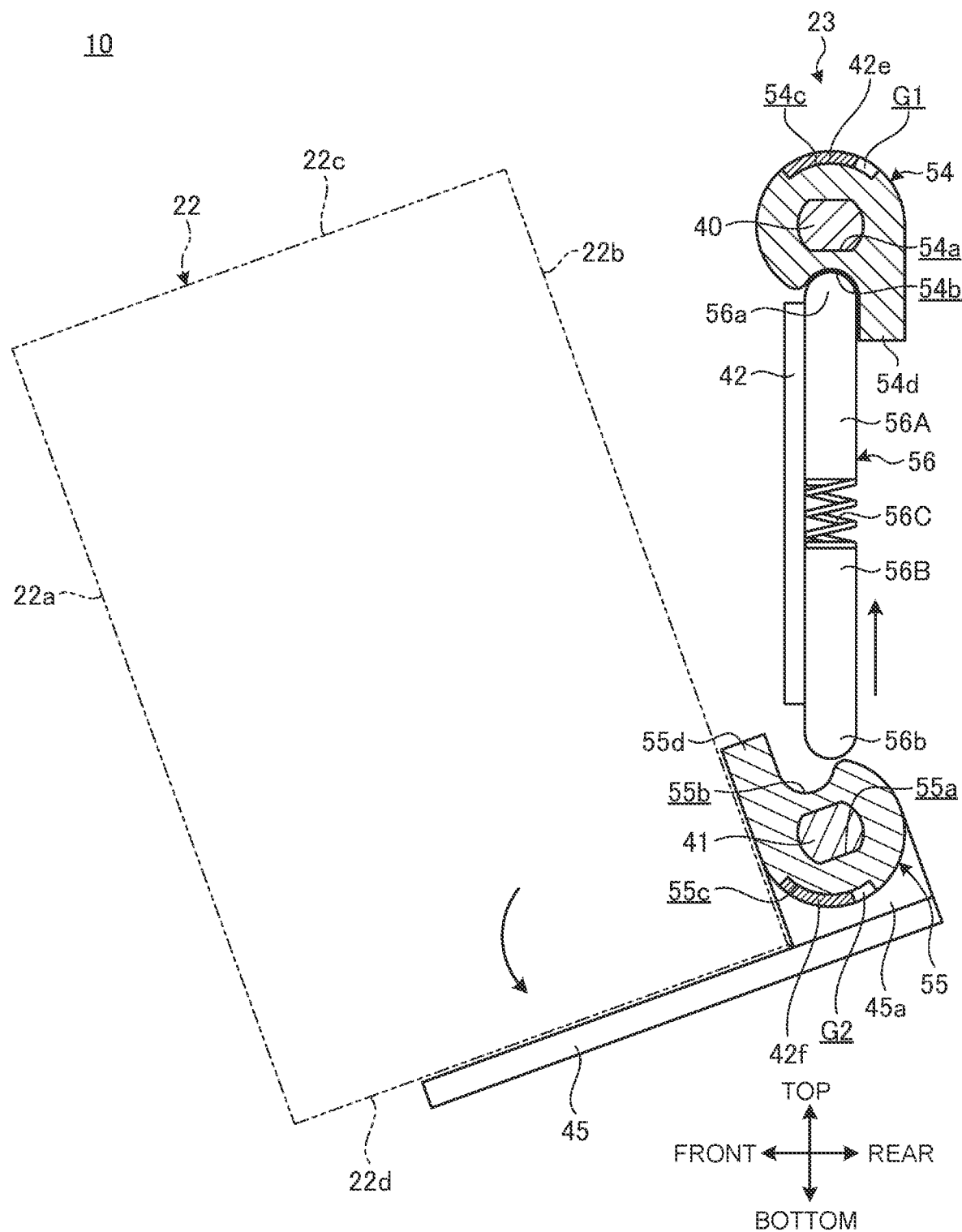
FIG. 8C is a side sectional view illustrating a state in which the bracket illustrated in FIG. 8A is tilted down.

The bracket 23 is a wall metal fitting that supports the chassis 22 on the wall 36 and enables tilt-up and tilt-down operations of the chassis 22 (see also FIGS. 8A to 8C). Herein, the state in which the bracket 23 and the chassis 22 attached to the bracket 23 are not tilted up or tilted down as illustrated in FIGS. 2A and 2B is referred to as "initial position". In the initial position, the bracket 23 is folded most thinly in the front-rear direction, and the rear surface 22b of the chassis 22 is closest to the wall 36 and is parallel to the wall 36.

As illustrated in FIGS. 3 to 5, the bracket 23 includes a first hinge shaft 40, a second hinge shaft 41, a base plate 42, a fixing plate 44, an attachment plate 45, and a stopper mechanism 46. The bracket 23 according to this embodiment further includes a first auxiliary plate 48, a second auxiliary plate 49, an auxiliary fixing plate 50, an auxiliary attachment plate 51, a first torque generator 52, and a second torque generator 53.

The hinge shafts 40 and 41 are metal shafts. The hinge shafts 40 and 41 are apart from each other in the top-down direction in a state in which their axial directions are parallel to each other. The cross section of each of the hinge shafts 40 and 41 has a circular part and a substantially elliptical part in the axial direction as appropriate.

The base plate 42 is a metal plate connecting the hinge shafts 40 and 41. The base plate 42 includes a plate 42a, a standing wall 42b, a first arm 42c, and a second arm 42d.

The plate 42a is a plate that forms the main body of the base plate 42. The plate 42a extends between the hinge shafts 40 and 41. In the initial position, the plane of the plate 42a extends in the top-bottom direction and the left-right direction, and is parallel to the wall 36. The standing wall 42b is a part formed by bending the left edge of the plate 42a rearward. Since the base plate 42 has the standing wall 42b formed on the side of the plate 42a, its cross-sectional shape is substantially L-shaped.

The first arm 42c protrudes upward from the top end surface of the base plate 42. In this embodiment, the first arm 42c is formed by protruding the top end of the standing wall 42b from the top end surface of the plate 42a. The first arm 42c has a through hole formed in the plate thickness direction, and the first hinge shaft 40 is relatively rotatably inserted through the through hole. Thus, the first arm 42c is relatively rotatably borne by the first hinge shaft 40.

The second arm 42d protrudes upward from the bottom end surface of the base plate 42. In this embodiment, the second arm 42d is formed by protruding the bottom end of the standing wall 42b from the bottom end surface of the plate 42a. The second arm 42d has a through hole formed in the plate thickness direction, and the second hinge shaft 41 is relatively rotatably inserted through the through hole. Thus, the second arm 42d is relatively rotatably borne by the second hinge shaft 41.

The first auxiliary plate 48 is a metal plate that supplements the strength of the connection between the base plate 42 and the first hinge shaft 40, and operates integrally with the base plate 42. The first auxiliary plate 48 is screw-fixed to an upper part of the rear surface of the base plate 42. The first auxiliary plate 48 has an arm 48a protruding from the top end surface, and the first hinge shaft 40 is relatively rotatably inserted through a through hole of the through hole.

The second auxiliary plate 49 is a metal plate that supplements the strength of the connection between the base plate 42 and the second hinge shaft 41, and operates integrally with the base plate 42. The second auxiliary plate 49 is screw-fixed to a lower part of the rear surface of the base plate 42. The second auxiliary plate 49 has an arm 49a protruding from the bottom end surface, and the second hinge shaft 41 is relatively rotatably inserted through the arm 49a. The auxiliary plates 48 and 49 may be omitted.

The fixing plate 44 is a metal plate for fixing the bracket 23 to the wall 36 as a mounting object. The bracket 23 according to this embodiment is fixed to the wall 36 via the bracket plate 30. Accordingly, the fixing plate 44 is screwed to the bracket plate 30 and indirectly fixed to the wall 36. The fixing plate 44 includes an arm 44a and screw holes 44b.

The fixing plate 44 has a standing wall formed by bending its upper edge rearward. The arm 44a is a plate that is formed by bending the left end of the standing wall upward and extends in the top-bottom direction and the front-rear direction. The arm 44a has a through hole through which the first hinge shaft 40 is relatively non-rotatably inserted. The fixing plate 44 thus operates integrally with the first hinge shaft 40. The screw holes 44b are parts that are screwed to the bracket plate 30. For example, three screw holes 44b are provided (see FIG. 5).

The auxiliary fixing plate 50 is a metal plate that supplements the strength of the connection between the fixing plate 44 and the first hinge shaft 40, and has the same function as the fixing plate 44. That is, the auxiliary fixing plate 50 has an arm 50a protruding from the top end surface, and the first hinge shaft 40 is relatively non-rotatably inserted through the arm 50a. The auxiliary fixing plate 50 has, for example, three screw holes 50b for screwing to the bracket plate 30 (see FIG. 5). The auxiliary fixing plate 50 is located side by side with the fixing plate 44 in the left-right direction so that the first arm 42c of the base plate 42 will be interposed between the fixing plate 44 and the auxiliary fixing plate 50. In the initial position, the plane of each of the fixing plates 44 and 50 extends in the top-bottom direction and the left-right direction, and is parallel to the base plate 42. The auxiliary fixing plate 50 may be omitted.

The attachment plate 45 is a metal plate for attaching the chassis 22 to the bracket 23. The attachment plate 45 includes an arm 45a and attachment holes 45b.

The arm 45a is a plate that is formed by bending the rear end of the right part of the attachment plate 45 upward and extends in the top-bottom direction and the front-rear direction. The arm 45a has a through hole through which the second hinge shaft 41 is relatively non-rotatably inserted. The attachment plate 45 thus operates integrally with the second hinge shaft 41. The attachment holes 45b are through holes through which screws to be fastened to screw holes formed in the bottom surface 22d of the chassis 22 are inserted. For example, two attachment holes 45b are provided (see FIG. 4). The chassis 22 is placed on the top surface of the attachment plate 45, and fastened to the attachment plate 45 using the attachment holes 45b.

The auxiliary attachment plate 51 is a metal plate that supplements the strength of the connection between the attachment plate 45 and the second hinge shaft 41. The auxiliary attachment plate 51 is screw-fixed to a rear part of the top surface of the attachment plate 45. The auxiliary attachment plate 51 has an arm 51a protruding from the top surface, and the second hinge shaft 41 is relatively non-rotatably inserted through the arm 51a. The arm 51a is located side by side with the arm 45a in the left-right direction so that the second arm 44d of the base plate 42 will be interposed between the arm 51a and the arm 45a. In the initial position, the plane of each of the attachment plates 45 and 51 extends in the front-rear direction and the left-right direction, and is orthogonal to the base plate 42. The auxiliary attachment plate 51 may be omitted.

As a result of the fixing plates 44 and 50 being fixed to the wall 36 via the bracket plate 30, the bracket 23 having the above-described structure wall-mounts and fixes the chassis 22 fixed to the top surface of the attachment plate 45, and enables the tilt-up and tilt-down operations of the chassis 22.

In the tilt-up operation, the chassis 22 is grasped and swung upward from the initial position illustrated in FIG. 2B. As a result, the base plate 42 and the attachment plates 45 and 51 in the bracket 23 rotate upward around the first hinge shaft 40 integrated with the fixing plates 44 and 50 fixed to the wall 36 as the rotation axis (see FIG. 3). Hence, the front surface 22a of the chassis 22 faces upward within a predetermined angle range.

In the tilt-down operation, the chassis 22 is grasped and swung downward from the initial position illustrated in FIG. 2B. As a result, the base plate 42 in the bracket 23 is integrated with the fixing plates 44 and 50 fixed to the wall 36. The second hinge shaft 41 rotates with the second arm 42d of the base plate 42 as a bearing, and the attachment plates 45 and 51 integrated with the second hinge shaft 41 rotate downward (see FIG. 4). Hence, the front surface 22a of the chassis 22 faces downward within a predetermined angle range.

The bracket 23 has a biaxial hinge structure having two hinge shafts 40 and 41, as mentioned above. There is accordingly a possibility that the rotation operation around the first hinge shaft 40 as the rotation axis and the rotation operation around the second hinge shaft 41 as the rotation axis are performed simultaneously. In such a case, the bottom end of the base plate 42 moves forward with the first hinge shaft 40 as the rotation center, so that the second hinge shaft 41 moves forward. In this state, the attachment plate 45 rotates around the second hinge shaft 41. This causes the chassis 22 to be in an unexpected posture, such as the protrusion amount of the chassis 22 from the wall 36 increasing more than expected or the chassis 22 translating forward from the initial position.

In view of this, the bracket 23 includes the stopper mechanism 46, and can selectively switch between the rotation operation around the first hinge shaft 40 as the rotation axis and the rotation operation around the second hinge shaft 41 as the rotation axis.

Figure 6A:
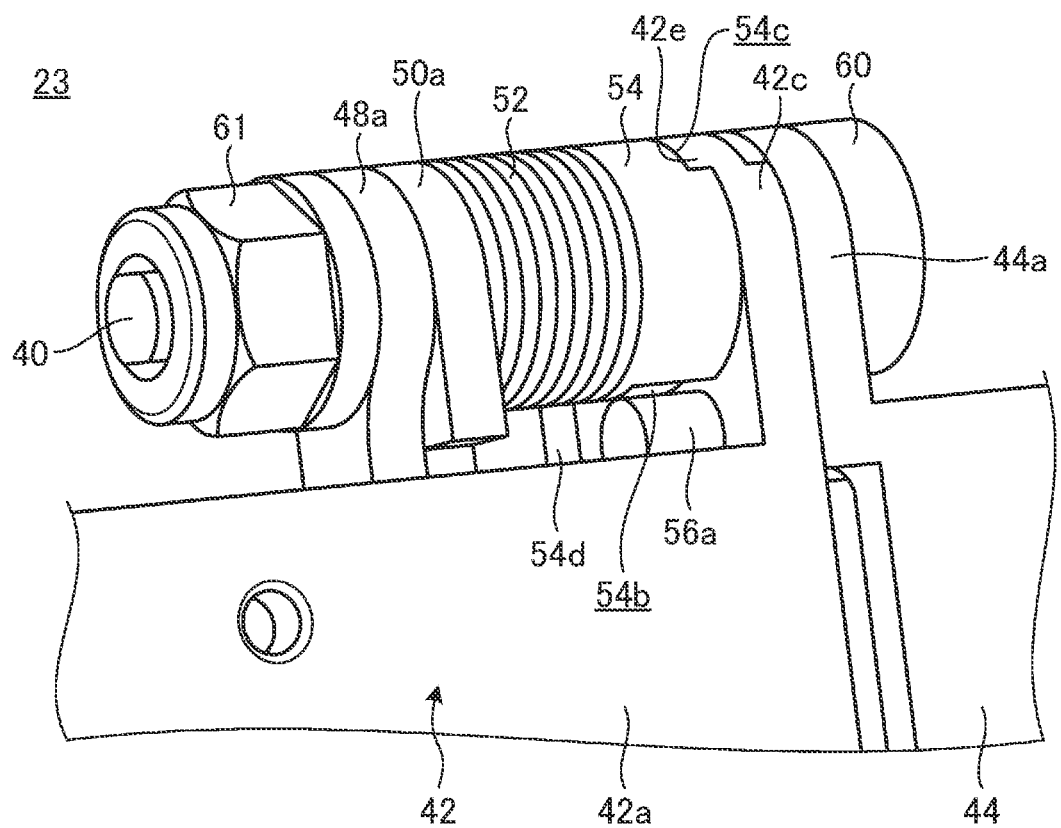
FIG. 6A is an enlarged perspective view of a first hinge shaft and its surroundings.
Figure 6B:
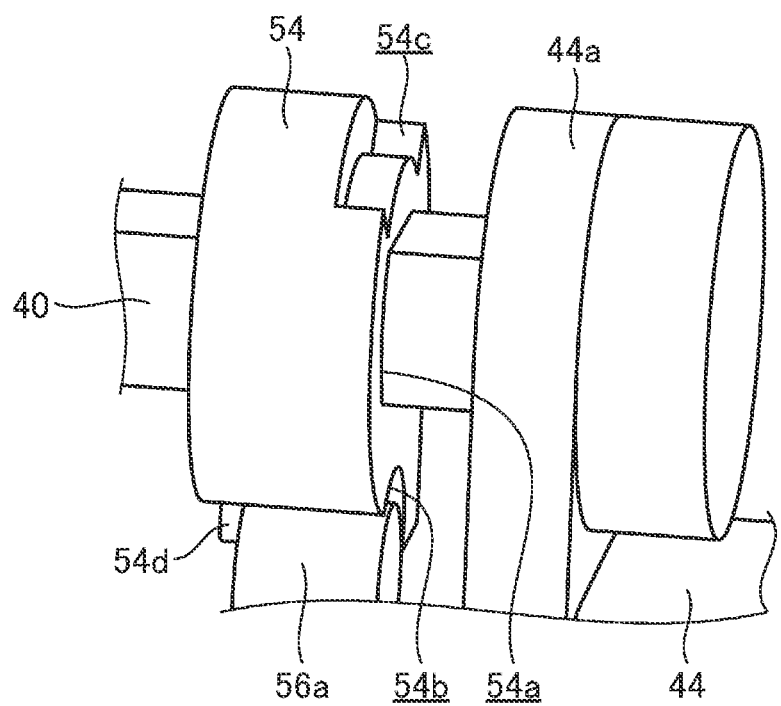
FIG. 6B is an enlarged perspective view of the first hinge shaft and its surroundings in a state in which a base plate and a first torque generator are removed.
Figure 7A:
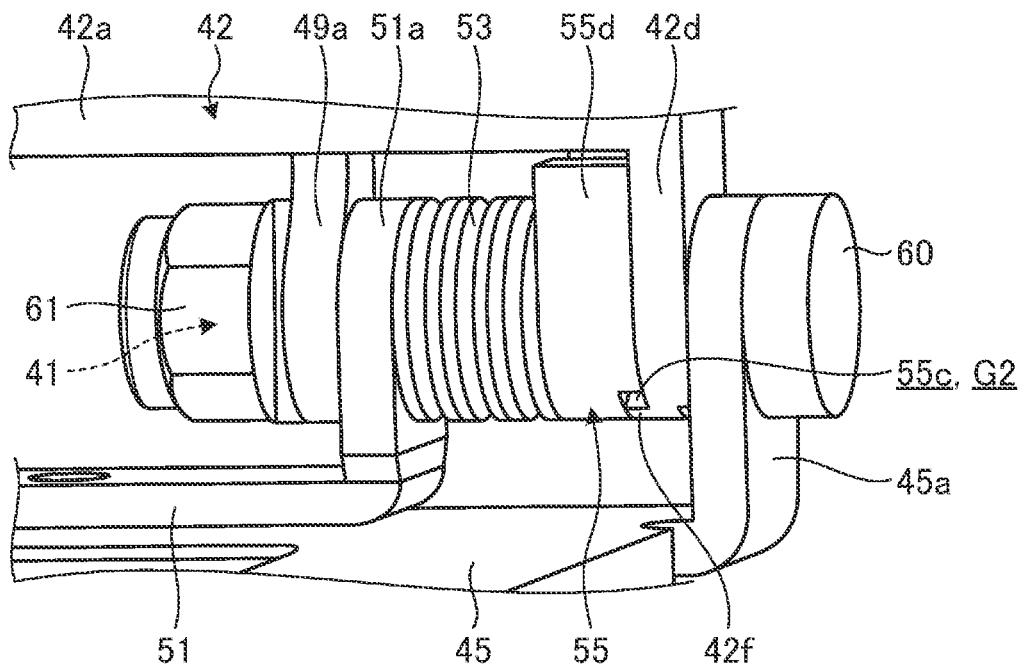
FIG. 7A is an enlarged perspective view of a second hinge shaft and its surroundings.
Figure 7B:
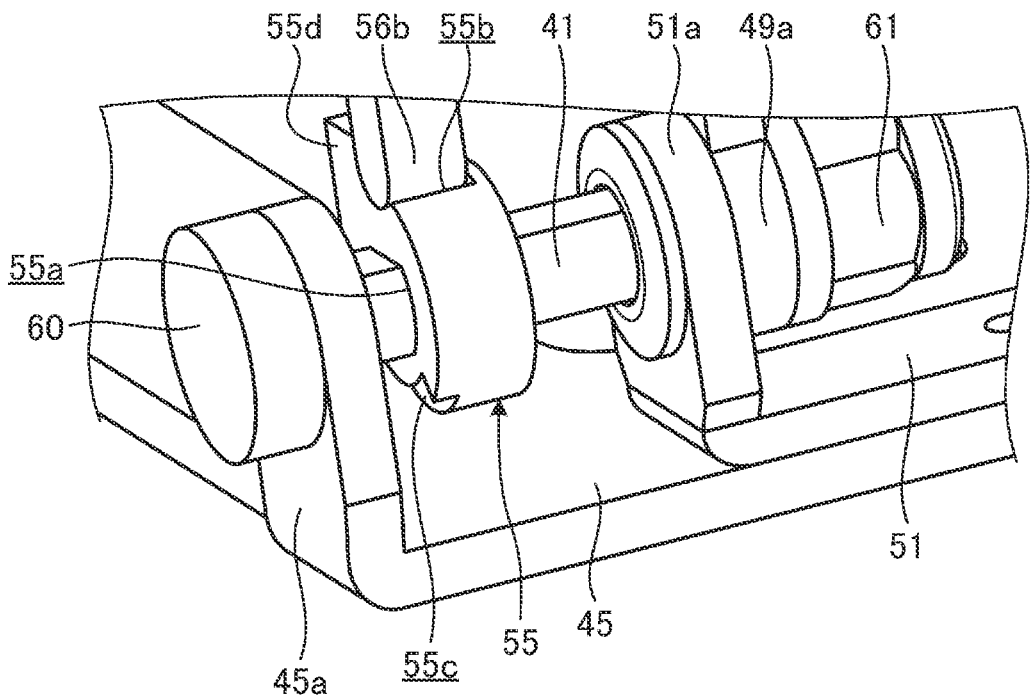
FIG. 7B is an enlarged perspective view of the second hinge shaft and its surroundings in a state in which the base plate and a second torque generator are removed.

FIG. 6A is an enlarged perspective view of the first hinge shaft 40 and its surroundings. FIG. 6B is an enlarged perspective view of the first hinge shaft 40 and its surroundings in a state in which the base plate 42 and the first torque generator 52 are removed. FIG. 7A is an enlarged perspective view of the second hinge shaft 41 and its surroundings. FIG. 7B is an enlarged perspective view of the second hinge shaft 41 and its surroundings in a state in which the base plate 42 and the second torque generator 53 are removed.

The stopper mechanism 46 is a mechanism that selectively restricts the rotation of the first arm 42c of the base plate 42 relative to the first hinge shaft 40 and the rotation of the second arm 42d of the base plate 42 relative to the second hinge shaft 41. In other words, the stopper mechanism 46 selectively restricts the relative rotation of the first arm 42c and the arm 44a of the fixing plate 44 around the axis of the first hinge shaft 40 and the relative rotation of the second arm 42d and the arm 45a of the attachment plate 45 around the axis of the second hinge shaft 41.

As illustrated in FIGS. 5 to 7B, the stopper mechanism 46 includes a first cam 54, a second cam 55, and a lock bar 56.

As illustrated in FIGS. 5 to 6B, the first cam 54 is a ring-shaped metal member. The first cam 54 includes an axial hole 54a, a first engagement hole 54b, a first groove 54c, and a first stopper 54d.

The axial hole 54a is a through hole along the axial center of the first cam 54. The inner peripheral surface of the axial hole 54a has a substantially elliptical shape having two parallel planes. The substantially elliptical part of the first hinge shaft 40 in cross section is relatively non-rotatably inserted through the axial hole 54a, and spline-fitted into the axial hole 54a (see FIG. 6B).

The first engagement hole 54b is a downward-facing arc-shaped groove formed in the bottom part of the outer peripheral surface of the first cam 54, and extends in the plate thickness direction of the first cam 54. An arc-shaped first end 56a of the lock bar 56 is engageable with and disengageable from the first engagement hole 54b (see also FIGS. 8A to 8C).

The first groove 54c is an upward-facing arc-shaped groove formed in the top part of the outer peripheral surface of the first cam 54. The first cam 54 is adjacent to the left part of the first arm 42c of the base plate 42. The first groove 54c is open on the right surface of the first cam 54 facing the first arm 42c, and extends in the circumferential direction of the first cam 54. A first projection 42e protruding from the left surface of the first arm 42c is inserted in the first groove 54c so as to be relatively movable. The first projection 42e has an arc shape extending along the first groove 54c. The total length of the first groove 54c is longer than the total length of the first projection 42e. Therefore, a gap G1 defining the relative moving distance of the first projection 42e in the first groove 54c is formed between the first groove 54c and the first projection 42e (see FIGS. 8A to 8C).

The first stopper 54d is a plate piece protruding tangentially from the outer peripheral surface of the first cam 54, and protrudes downward from the rear surface of the first cam 54. In the initial position, the first stopper 54d is in contact with the rear surface (first surface) of the lock bar 56 (see FIGS. 5 and 8A).

As illustrated in FIGS. 5, 7A, and 7B, the second cam 55 is a ring-shaped metal member. The second cam 55 includes an axial hole 55a, a second engagement hole 55b, a second groove 55c, and a second stopper 55d.

The axial hole 55a may have the same shape as the axial hole 54a of the first cam 54. The substantially elliptical part of the second hinge shaft 41 in cross section is relatively non-rotatably inserted through the axial hole 55a, and is spline-fitted into the axial hole 55a (see FIG. 7B).

The second engagement hole 55b is an upward-facing arc-shaped groove formed in the top part of the outer peripheral surface of the second cam 55, and extends in the plate thickness direction of the second cam 55. An arc-shaped second end 56b of the lock bar 56 is engageable with and disengageable from the second engagement hole 55b (see also FIGS. 8A to 8C).

The second groove 55c is a downward-facing arc-shaped groove formed in the bottom part of the outer peripheral surface of the second cam 55. The second cam 55 is adjacent to the left part of the second arm 42d of the base plate 42. The second groove 55c is open on the right surface of the second cam 55 facing the second arm 42d, and extends in the circumferential direction of the second cam 55. A second projection 42f protruding from the left surface of the second arm 42d is inserted in the second groove 55c so as to be relatively movable. The second projection 42f has an arc shape extending along the second groove 55c. The total length of the second groove 55c is longer than the total length of the second projection 42f. Therefore, a gap G2 defining the relative moving distance of the second projection 42f in the second groove 55c is formed between the second groove 55c and the second projection 42f (see FIGS. 8A to 8C).

The second stopper 55d is a plate piece protruding tangentially from the outer peripheral surface of the second cam 55, and protrudes downward from the front surface of the second cam 55. In the initial position, the second stopper 55d is in contact with the front surface (second surface) of the lock bar 56 (see FIGS. 5 and 8A).

As illustrated in FIG. 5, the lock bar 56 is supported between the upper and lower cams 54 and 55 so as to be movable in the top-bottom direction relative to the rear surface of the base plate 42. Reference symbol 58 in FIG. 5 is a substantially crank-shaped guide plate that guides sliding of the lock bar 56 in the top-bottom direction on the rear surface of the base plate 42.

The total length of the lock bar 56 is shorter than the pitch between the engagement holes 54b and 55b. Specifically, the total length of the lock bar 56 is such that, in a state in which the first end 56a engages with the first engagement hole 54b, the second end 56b disengages from the second engagement hole 55b upward and slightly separates from the outer peripheral surface of the second cam 55. In other words, the lock bar 56 has such a length with which, in a state in which the second end 56b engages with the second engagement hole 55b, the first end 56a disengages from the first engagement hole 54b downward and slightly separates from the outer peripheral surface of the first cam 54.

As illustrated in FIG. 5, the lock bar 56 in this embodiment includes a first bar 56A and a second bar 56B that are divided into two in the top-bottom direction, and an elastic member 56C connecting the bars 56A and 56B (see also FIG. 8A).

The first bar 56A has the first end 56a at its top end. The second bar 56B has the second end 56b at its bottom end. The elastic member 56C is an extendable member connecting the bottom end of the first bar 56A and the top end of the second bar 56B, and is, for example, a coil spring. With such a structure, the lock bar 56 in this embodiment can reduce the distance between the first end 56a and the second end 56b, i.e. the total length.

As illustrated in FIG. 6A, the first torque generator 52 applies a predetermined rotational torque to the rotation of the first arm 42c of the base plate 42 and the arm 48a of the first auxiliary plate 48 around the axis of the first hinge shaft 40. The first torque generator 52 is formed by, for example, stacking a plurality of metal disc springs, and has, at the axial center of each disc spring, a through hole through which the first hinge shaft 40 is inserted.

In FIG. 6A, reference symbol 60 is an end cap, and reference symbol 61 is a nut. The end cap 60 is fixed to one end of the first hinge shaft 40, and the nut 61 is fastened to the other end of the first hinge shaft 40. The bracket 23 can adjust the torque generated by the first torque generator 52, by adjusting the tightening torque of the nut 61.

As illustrated in FIG. 7A, the second torque generator 53 applies a predetermined rotational torque to the rotation of the second arm 42d of the base plate 42 and the arm 49a of the second auxiliary plate 49 around the axis of the second hinge shaft 41. The structure of the second torque generator 53 and its surroundings is the same as or similar to the structure of the first torque generator 52 and its surroundings described above. That is, the second hinge shaft 41 is equally provided with an end cap 60 and a nut 61. The bracket 23 can adjust the torque generated by the second torque generator 53, by adjusting the tightening torque of the nut 61.

The tilt-up operation and the tilt-down operation of the bracket 23 including the stopper mechanism 46 described above will be described below.

FIG. 8A is a schematic side sectional view of the bracket 23 in the initial position. FIG. 8B is a side sectional view illustrating a state in which the bracket 23 illustrated in FIG. 8A is tilted up. FIG. 8C is a side sectional view illustrating a state in which the bracket 23 illustrated in FIG. 8A is tilted down. In FIGS. 8A to 8C, the chassis 22 attached to the attachment plate 45 is designated by dashed-two dotted lines.

As illustrated in FIG. 8A, in the initial position, the lock bar 56 slides downward under its own weight, and the first end 56a disengages from the first engagement hole 54b of the first cam 54 and the second end 56b engages with the second engagement hole 55b of the second cam 55. That is, the lock bar 56 engages with the second cam 55 that is relatively non-rotatably connected to the second hinge shaft 41. Accordingly, the base plate 42 connected to the lock bar 56 is integrated with the second hinge shaft 41 and the attachment plates 45 and 51 relatively non-rotatably connected to the second hinge shaft 41. As a result, the relative rotation between the second hinge shaft 41 and the second arm 42d of the base plate 42 is restricted in the bracket 23.

Meanwhile, the lock bar 56 disengages from the first cam 54 that is relatively non-rotatably connected to the first hinge shaft 40. Accordingly, the relative rotation between the first arm 42c of the base plate 42 and the first hinge shaft 40 is allowed in the bracket 23. Here, the first hinge shaft 40 is integrated with the fixing plates 44 and 50 fixed to the wall 36 via the bracket plate 30.

In the case of performing the tilt-up operation illustrated in FIG. 8B from this initial position, the chassis 22 is grasped and swung upward. As a result, by the upward external force applied to the chassis 22, the base plate 42 in the bracket 23 rotates upward together with the attachment plates 45 and 51 and the chassis 22 fixed to the attachment plates 45 and 51 around the first hinge shaft 40 integrated with the wall 36 as the rotation axis (see FIG. 8B).

In this way, the chassis 22 can be tilted up to a desired angle. During this tilt-up operation, the first projection 42e provided on the first arm 42c of the base plate 42 moves in the first groove 54c of the first cam 54 (see FIGS. 8A and 8B). The distance by which the first projection 42e can move in the first groove 54c is regulated by the gap G1. Hence, the distance by which the first projection 42e can move in the first groove 54c regulates the angle range of the relative rotation between the first hinge shaft 40 and the base plate 42 during the tilt-up operation, i.e. the tilt-up angle of the chassis 22. In the electronic apparatus 10 according to this embodiment, the tilt-up angle is 15 degrees.

In the case of performing the tilt-down operation illustrated in FIG. 8C from the initial position illustrated in FIG. 8A, the chassis 22 is grasped and swung downward. As a result, by the downward external force applied to the chassis 22, the second hinge shaft 41 and the attachment plates 45 and 51 integrated with the second hinge shaft 41 in the bracket 23 rotate with the second arm 42d of the base plate 42 as a bearing. Here, the second cam 55 relatively non-rotatably connected to the second hinge shaft 41 rotates, too. Consequently, the inner peripheral surface of the second engagement hole 55b of the second cam 55 slides on the second end 56b of the lock bar 56, and the lock bar 56 is pushed up along the inclined surface provided at the edge of the second engagement hole 55b (see FIG. 8C). That is, the lock bar 56 slides upward against its own weight.

As a result, the lock bar 56 has the first end 56a engaging with the first engagement hole 54b of the first cam 54, and the second end 56b disengaging from the second engagement hole 55b of the second cam 55. That is, the lock bar 56 engages with the first engagement hole 54b of the first cam 54 that is relatively non-rotatably connected to the first hinge shaft 40. Accordingly, the base plate 42 connected to the lock bar 56 is integrated with the first hinge shaft 40 and the fixing plates 44 and 50 relatively non-rotatably connected to the first hinge shaft 40. Consequently, the relative rotation between the first hinge shaft 40 and the first arm 42c of the base plate 42 is restricted in the bracket 23.

Meanwhile, the lock bar 56 disengages from the second cam 55 that is relatively non-rotatably connected to the second hinge shaft 41. Accordingly, the relative rotation between the second arm 42d of the base plate 42 and the second hinge shaft 41 is allowed in the bracket 23. Here, the second hinge shaft 41 is integrated with the attachment plate 45 and the chassis 22 fixed to the attachment plate 45.

In this way, the chassis 22 can be tilted down to a desired angle. During this tilt-down operation, the second projection 42f provided on the second arm 42d of the base plate 42 moves in the second groove 55c of the second cam 55 (see FIGS. 8A and 8C). The distance by which the second projection 42f can move in the second groove 55c is regulated by the gap G2. Hence, the distance by which the second projection 42f can move in the second groove 55c regulates the angle range of the relative rotation between the second hinge shaft 41 and the base plate 42 during the tilt-down operation, i.e. the tilt-down angle of the chassis 22. In the electronic apparatus 10 according to this embodiment, the tilt-down angle is 15 degrees.

When the bracket 23 is in the initial position illustrated in FIG. 8A, the first stopper 54d of the first cam 54 is in contact with the rear surface of the lock bar 56 and the second stopper 55d of the second cam 55 is in contact with the front surface of the lock bar 56. This prevents the base plate 42 from inverse-rotating rearward around the first hinge shaft 40 as the rotation center and prevents the attachment plates 45 and 51 from inverse-rotating upward around the second hinge shaft 41 as the rotation center in the bracket 23.

Figure 9:
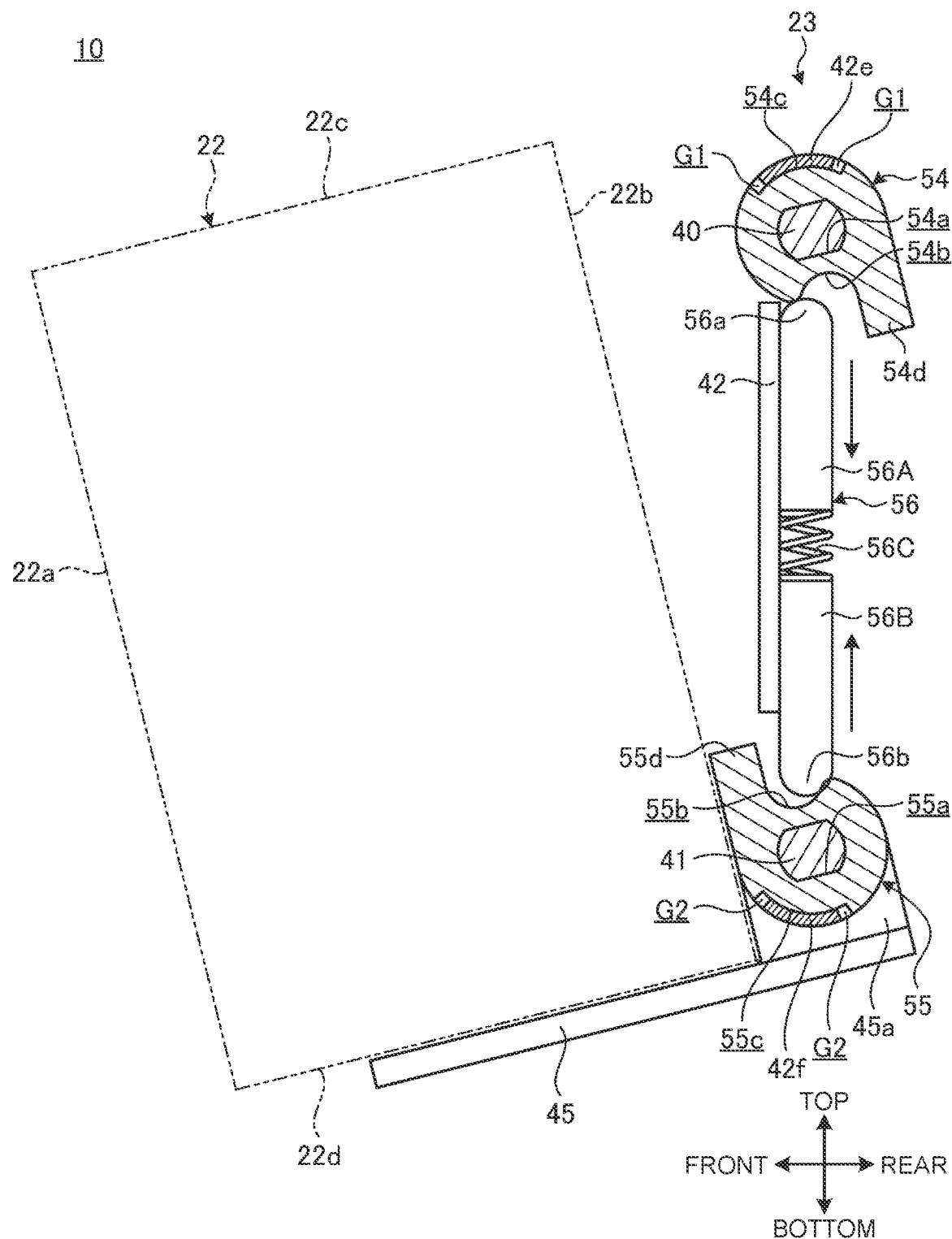
FIG. 9 is a side sectional view illustrating a state in which a lock bar is stuck between a first cam and a second cam from the state illustrated in FIG. 8A.
Figure 10:
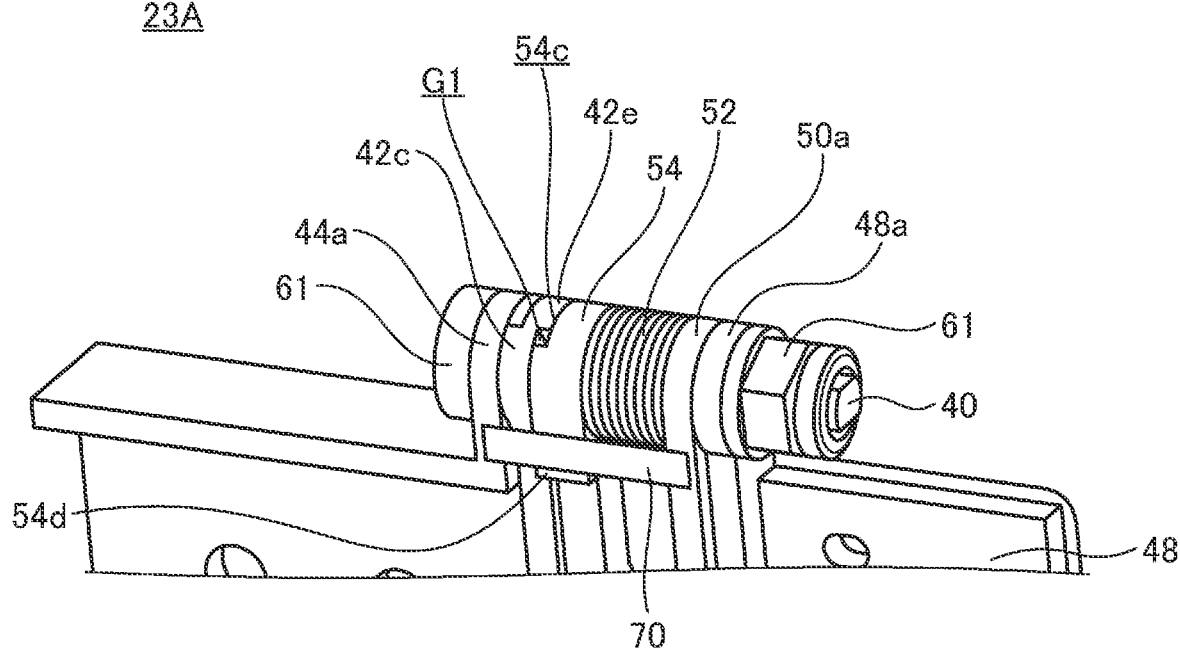
FIG. 10 is an enlarged perspective view of a first hinge shaft and its surroundings in a bracket according to a modification.
Figure 11:
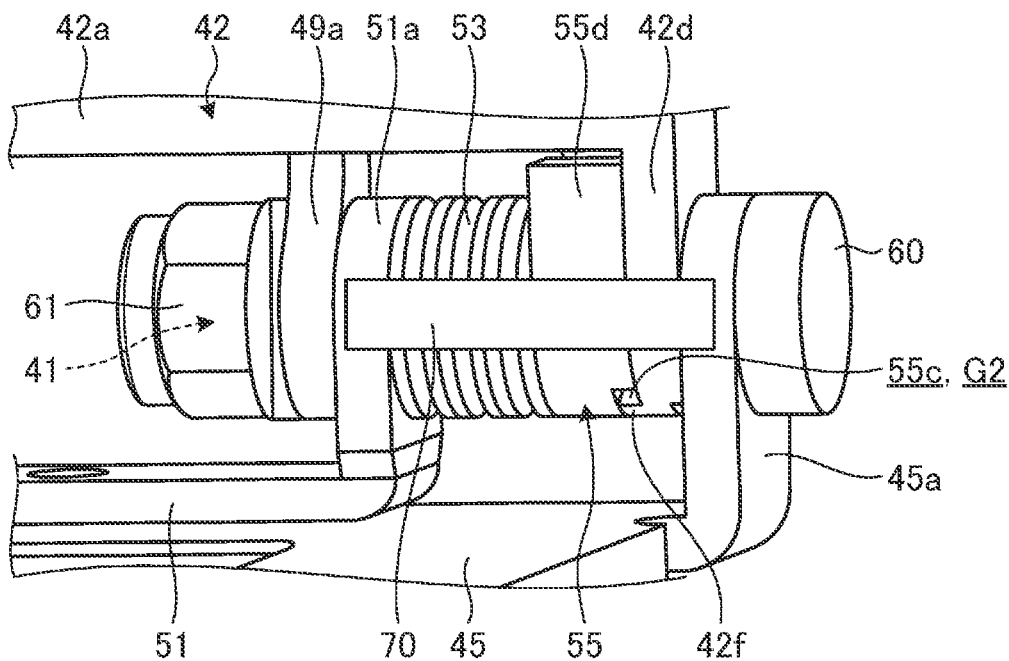
FIG. 11 is an enlarged perspective view of a second hinge shaft and its surroundings in the bracket illustrated in FIG. 10.
Figure 12A:
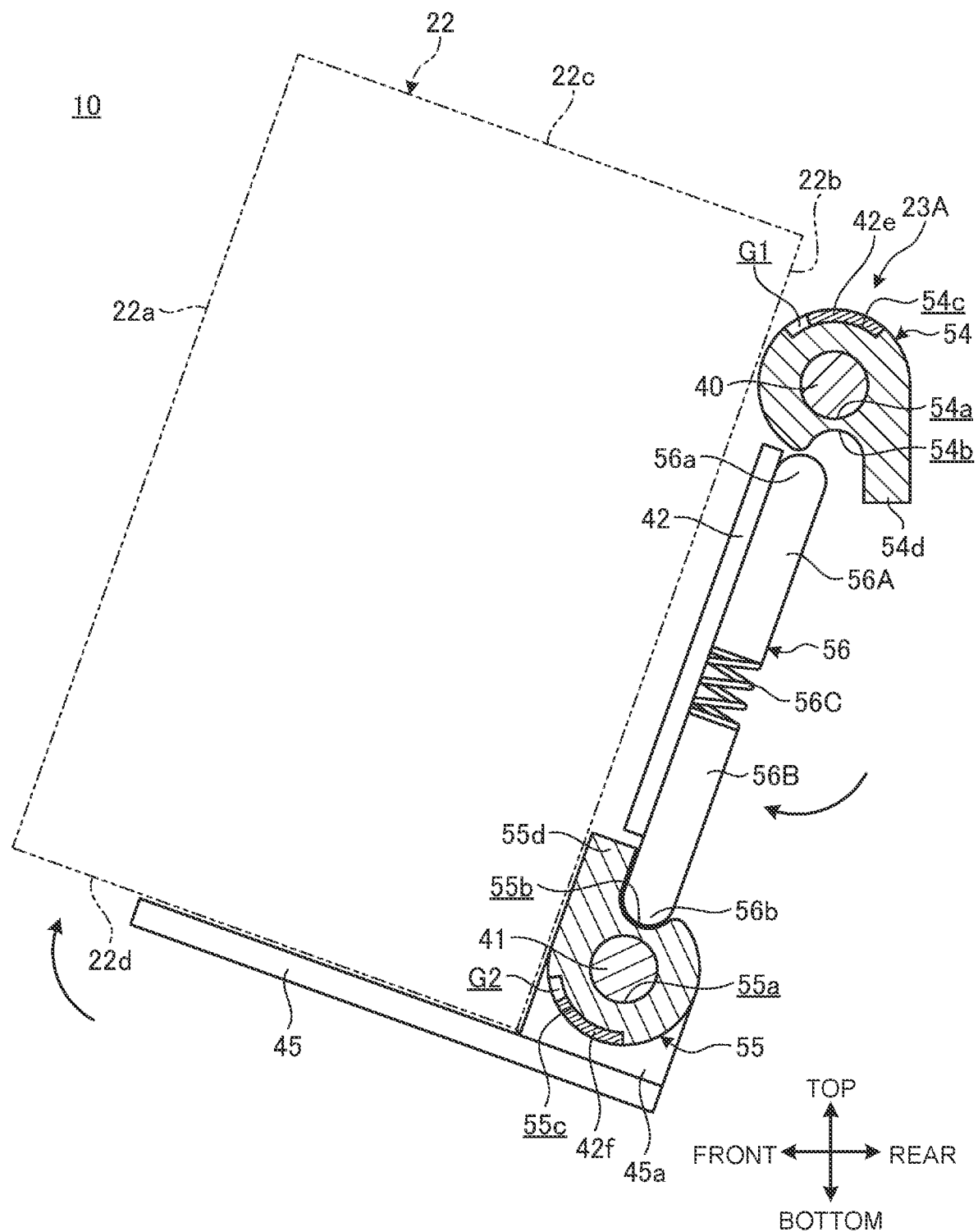
FIG. 12A is a schematic side sectional view illustrating a state in which the bracket illustrated in FIG. 10 is tilted up.
Figure 12B:
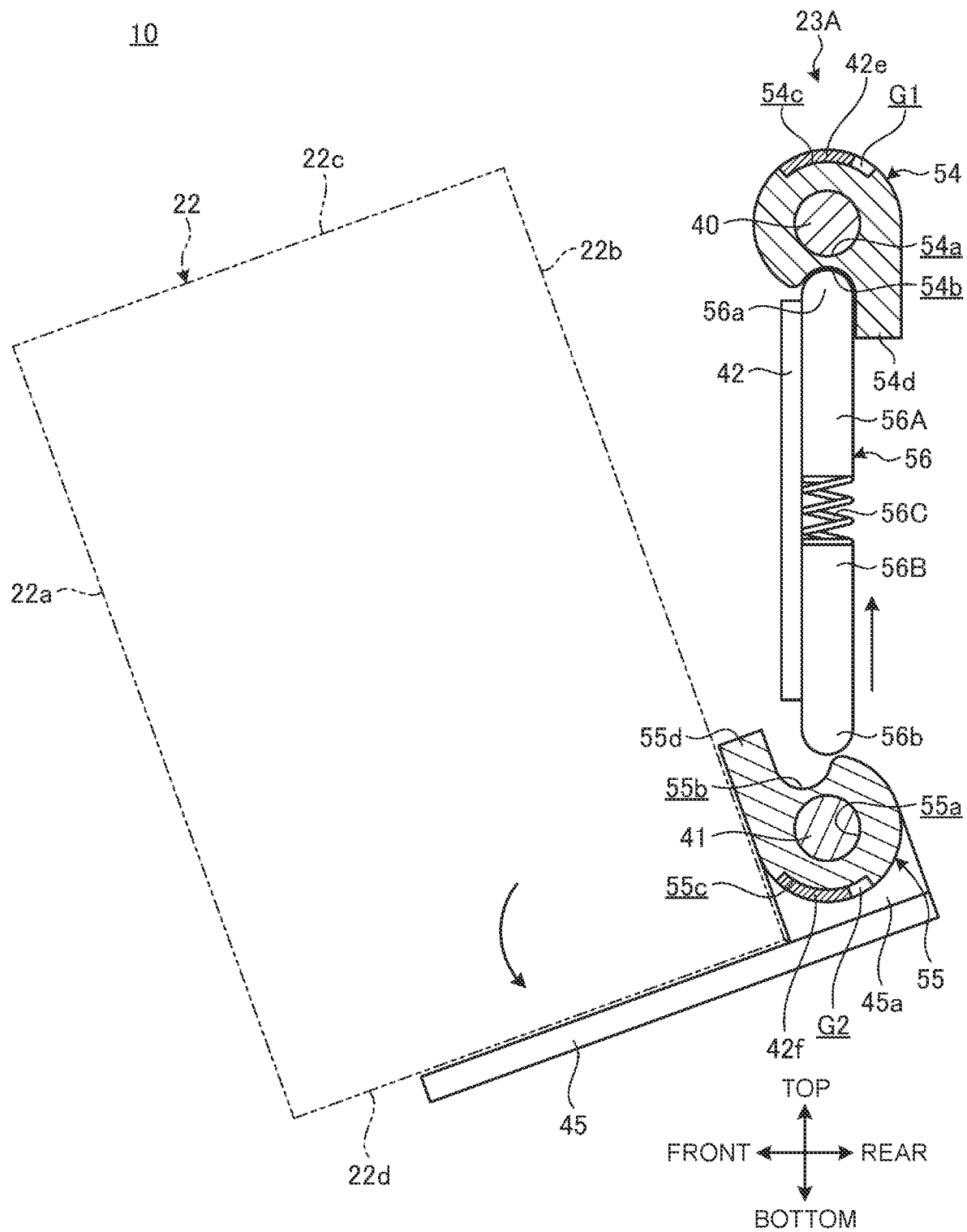
FIG. 12B is a schematic side sectional view illustrating a state in which the bracket illustrated in FIG. 10 is tilted down.

FIG. 9 is a side sectional view illustrating a state in which the lock bar 56 is stuck between the first cam 54 and the second cam 55 from the state illustrated in FIG. 8A.

The bracket 23 includes the two hinge shafts 40 and 41. Therefore, for example when the chassis 22 is forcibly pulled forward, the bracket 23 rotates around the axes of the hinge shafts 40 and 41 simultaneously. This can cause the lock bar 56 to be in a stuck state in which the first end 56a gets caught on the inclined surface provided at the edge of the first engagement hole 54b and simultaneously the second end 56b gets caught on the inclined surface provided at the edge of the second engagement hole 55b, as illustrated in FIG. 9.

In this stuck state, the rotation operations around the axes of the hinge shafts 40 and 41 are simultaneously restricted. An attempt to forcibly swing the chassis 22 upward or downward from the stuck state in the electronic apparatus 10 causes an excessive load on each part of the bracket 23, and can lead to damage or malfunction.

In view of this, the lock bar 56 in this embodiment includes the two bars 56A and 56B divided in the top-bottom direction, and the elastic member 56C connecting the bars 56A and 56B. In the case where an excessive force is applied to the chassis 22 from the stuck state illustrated in FIG. 9, the elastic member 56C contracts and the total length of the lock bar 56 shortens in the bracket 23. This clears the stuck state in which the ends 56a and 56b of the lock bar 56 get caught on the inclined surfaces of the engagement holes 54b and 55b. Subsequently, for example, the chassis 22 is pushed rearward to return the bracket 23 to the initial position, as a result of which normal tilt-up and tilt-down operations can be performed again.

As described above, the electronic apparatus 10 according to this embodiment includes: the chassis 22 that contains electronic components and has the camera 24, the display unit 27, and/or the light 26 on the front surface 22a; and the bracket 23 that is attached to the rear surface 22b of the chassis 22 and used for wall-mounting and fixing the chassis 22. The bracket 23 includes the stopper mechanism 4 that selectively restricts the relative rotation of the first arm 42c of the base plate 42 and the fixing plate 44 around the axis of the first hinge shaft 40 and the relative rotation of the second arm 42d of the base plate 42 and the attachment plate 45 around the axis of the second hinge shaft 41.

Thus, the electronic apparatus 10 can selectively execute the tilt-up operation around the first hinge shaft 40 as the rotation center and the tilt-down operation around the second hinge shaft 41 as the rotation center, for the chassis 22 wall-mounted and fixed via the bracket 23. The bracket 23 includes the hinge shafts 40 and 41 which are two shafts arranged in the top-bottom direction. Therefore, in both the tilt-up operation and the tilt-down operation, the top and bottom corners of the rear surface 22b of the chassis 22 are kept from interfering with the wall 36, and a large movable range of, for example, 15 degrees can be secured at each of the top and the bottom, as illustrated in FIGS. 2B and 8A to 8C. Moreover, the bracket 23 does not need a motor mechanism, and its thickness in the depth direction can be minimized by the effect of expanding the angle range of the chassis 22 by the foregoing two shafts. The depth dimension of the bracket 23 according to this embodiment in the initial position is, for example, 10 mm or less, so that the protrusion length of the electronic apparatus 10 including the chassis 22 from the wall 36 is 100 mm or less.

The above describes a structure in which the first arm 42c of the base plate 42 is relatively rotatably borne by the first hinge shaft 40 and the fixing plate 44 is relatively non-rotatably connected to the first hinge shaft 40 and the second arm 42d of the base plate 42 is relatively rotatably borne by the second hinge shaft 41 and the attachment plate 45 is relatively non-rotatably connected to the second hinge shaft 41.

Alternatively, the bracket 23 may have a structure in which the first arm 42c of the base plate 42 is relatively non-rotatably connected to the first hinge shaft 40 and the fixing plate 44 is relatively rotatably borne by the first hinge shaft 40 and the second arm 42d of the base plate 42 is relatively non-rotatably connected to the second hinge shaft 41 and the attachment plate 45 is relatively rotatably borne by the second hinge shaft 41. In this case, for example, the first cam 54 is integrally connected to the fixing plate 44, and the second cam 5 is integrally connected to the attachment plate 45. This structure will be described in more detail below, using a bracket 23A according to a modification illustrated in FIGS. 10 to 12B.

As illustrated in FIGS. 10 to 12B, in the bracket 23A, the first arm 42c is relatively non-rotatably connected to the first hinge shaft 40, the second arm 42d is relatively non-rotatably connected to the second hinge shaft 41, the fixing plates 44 and 50 are relatively rotatably borne by the first hinge shaft 40, and the attachment plates 45 and 51 are relatively rotatably borne by the second hinge shaft 41. In this case, the first cam 54 of the stopper mechanism 46 is relatively rotatably borne by the first hinge shaft 40 and is relatively non-rotatably connected to the fixing plates 44 and 50, and the second cam 55 of the stopper mechanism 46 is relatively rotatably connected to the second hinge shaft 41 and is relatively non-rotatably connected to the attachment plates 45 and 51. The first cam 54 and the fixing plates 44 and 50 are integrally connected to each other by, for example, a metal plate 70 fixed to their rear surfaces. Likewise, the second cam 55 and the attachment plates 45 and 51 are integrally connected to each other by, for example, a metal plate 70 fixed to their front surfaces. Each metal plate 70 is not fixed to the arms 42*c* and 42*d* of the base plate 42.

As a result of the second end 56*b* disengaging from the second engagement hole 55*b* in a state in which the first end 56*a* engages with the first engagement hole 54*b*, the lock bar 56 of the stopper mechanism 46 restricts the rotation of the fixing plates 44 and 50 relative to the first hinge shaft 40 and allows the rotation of the attachment plates 45 and 51 relative to the second hinge shaft 41. Thus, the attachment plates 45 and 51 and the second cam 55 rotate relative to the second hinge shaft 41 and the base plate 42, and the bracket 23A is tilted down (see FIG. 12B). As a result of the first end 56*a* disengaging from the first engagement hole 54*b* in a state in which the second end 56*b* engages with the second engagement hole 55*b*, the lock bar 56 restricts the rotation of the attachment plates 45 and 51 relative to the second hinge shaft 41 and allows the rotation of the fixing plates 44 and 50 relative to the first hinge shaft 40. In this way, the base plate 42, together with the first hinge shaft 40, rotates around the axis of the first hinge shaft 40 to thus rotate relative to the fixing plates 44 and 50 and the first cam 54, and the bracket 23A is tilted up (see FIG. 12A).

The present invention is not limited to the embodiments described above, and changes can be made freely without departing from the gist of the present invention.

The invention claimed is:

1. A bracket for an electronic apparatus, the bracket comprising:
    a first hinge shaft;
    a second hinge shaft;
    a base plate including a first arm supported by the first hinge shaft and a second arm supported by the second hinge shaft;
    a fixing plate supported by the first hinge shaft and rotatable relative to the first arm around an axis of the first hinge shaft, and configured to fix the bracket to a mounting object;
    an attachment plate supported by the second hinge shaft and rotatable relative to the second arm around an axis of the second hinge shaft, and configured to have a chassis of the electronic apparatus attached thereto; and
    a stopper mechanism configured to selectively restrict relative rotation of the first arm and the fixing plate around the axis of the first hinge shaft and relative rotation of the second arm and the attachment plate around the axis of the second hinge shaft,
    wherein the first arm is rotatably connected to the first hinge shaft,
    wherein the second arm is rotatably connected to the second hinge shaft,
    wherein the fixing plate is non-rotatably connected to the first hinge shaft,
    wherein the attachment plate is non-rotatably connected to the second hinge shaft,
    wherein the stopper mechanism includes: a first cam having a first engagement hole and non-rotatably connected to the first hinge shaft; a second cam having a second engagement hole and non-rotatably connected to the second hinge shaft; and a lock bar movably supported by the base plate between the first cam and the second cam, and having a first end engageable with and disengageable from the first engagement hole and a second end engageable with and disengageable from the second engagement hole, and
    wherein the lock bar is configured to: as a result of the second end disengaging from the second engagement hole when the first end engages with the first engagement hole, restrict rotation of the first arm relative to the first hinge shaft and allow rotation of the second arm relative to the second hinge shaft and to thereby enable rotation of the attachment plate around the axis of the second hinge shaft; and as a result of the first end disengaging from the first engagement hole when the second end engages with the second engagement hole, restrict rotation of the second arm relative to the second hinge shaft and allow rotation of the first arm relative to the first hinge shaft and to thereby enable rotation of the base plate around the axis of the first hinge shaft.

2. The bracket according to claim 1, wherein the first cam is ring-shaped, and has a first groove extending in a circumferential direction on an outer peripheral surface thereof,
    wherein the second cam is ring-shaped, and has a second groove extending in a circumferential direction on an outer peripheral surface thereof,
    wherein the first arm has a first projection configured to move in the first groove to regulate relative rotation between the first hinge shaft and the base plate, and
    wherein the second arm has a second projection configured to move in the second groove to regulate relative rotation between the second hinge shaft and the base plate.

3. The bracket according to claim 1, wherein the first cam includes a first stopper configured to contact a first surface of the lock bar and regulate a direction of relative rotation between the first hinge shaft and the base plate, and
    wherein the second cam includes a second stopper configured to contact a second surface of the lock bar and regulate a direction of relative rotation between the second hinge shaft and the base plate.

4. The bracket according to claim 1, wherein the lock bar includes: a first bar having the first end; a second bar having the second end and aligned in a longitudinal direction with the first bar; and an elastic member connecting the first bar and the second bar and configured to reduce a distance between the first end and the second end.

5. A bracket for an electronic apparatus, the bracket comprising:
    a first hinge shaft;
    a second hinge shaft;
    a base plate including a first arm supported by the first hinge shaft and a second arm supported by the second hinge shaft;
    a fixing plate supported by the first hinge shaft and rotatable relative to the first arm around an axis of the first hinge shaft, and configured to fix the bracket to a mounting object;
    an attachment plate supported by the second hinge shaft and rotatable relative to the second arm around an axis of the second hinge shaft, and configured to have a chassis of the electronic apparatus attached thereto; and a stopper mechanism configured to selectively restrict relative rotation of the first arm and the fixing plate around the axis of the first hinge shaft and relative rotation of the second arm and the attachment plate around the axis of the second hinge shaft, wherein the first arm is non-rotatably connected to the first hinge shaft, wherein the second arm is non-rotatably connected to the second hinge shaft, wherein the fixing plate is rotatable about the first hinge shaft, wherein the attachment plate is rotatable about the second hinge shaft, wherein the stopper mechanism includes: a first cam having a first engagement hole, rotatable about the first hinge shaft, and non-rotatable relative to the fixing plate; a second cam having a second engagement hole, rotatable about the second hinge shaft, and non-rotatable relative to the attachment plate; and a lock bar movably supported by the base plate between the first cam and the second cam, and having a first end engageable with and disengageable from the first engagement hole and a second end engageable with and disengageable from the second engagement hole, and wherein the lock bar is configured to: as a result of the second end disengaging from the second engagement hole when the first end engages with the first engagement hole, restrict rotation of the fixing plate relative to the first hinge shaft and allow rotation of the attachment plate relative to the second hinge shaft and to thereby enable rotation of the attachment plate around the axis of the second hinge shaft; and as a result of the first end disengaging from the first engagement hole when the second end engages with the second engagement hole, restrict rotation of the attachment plate relative to the second hinge shaft and allow rotation of the fixing plate relative to the first hinge shaft and to thereby enable rotation of the base plate around the axis of the first hinge shaft.

6. An electronic apparatus comprising:
a chassis containing an electronic component and having a camera or a display unit on a first surface thereof; and
a bracket attached to a second surface of the chassis and configured to wall-mount and fix the chassis,
wherein the bracket includes:
  a first hinge shaft;
  a second hinge shaft;
  a base plate including a first arm supported by the first hinge shaft and a second arm supported by the second hinge shaft;
  a fixing plate supported by the first hinge shaft and rotatable relative to the first arm around an axis of the first hinge shaft, and configured to fix the bracket to a wall;
  an attachment plate supported by the second hinge shaft and rotatable relative to the second arm around an axis of the second hinge shaft, and having the chassis of the electronic apparatus attached thereto; and
  a stopper mechanism configured to selectively restrict relative rotation of the first arm and the fixing plate around the axis of the first hinge shaft and relative rotation of the second arm and the attachment plate around the axis of the second hinge shaft,
wherein the base plate and the fixing plate are parallel to each other, and the base plate and the attachment plate are orthogonal to each other when the chassis is close to the wall.

* * * * *